United States Patent
Baran

(10) Patent No.: US 7,086,440 B2
(45) Date of Patent: Aug. 8, 2006

(54) PNEUMATIC TIRE WITH ANNULAR REINFORCING STRIP LAYER

(75) Inventor: Woiciech Franciszek Baran, Ettelbruck (LU)

(73) Assignee: The Goodyear Tire & Rubber Company, Akron, OH (US)

(*) Notice: Subject to any disclaimer, the term of this patent is extended or adjusted under 35 U.S.C. 154(b) by 145 days.

(21) Appl. No.: 10/713,342

(22) Filed: Nov. 14, 2003

(65) Prior Publication Data

US 2005/0103418 A1     May 19, 2005

(51) Int. Cl.
*B60C 17/00*   (2006.01)
*B60C 9/18*    (2006.01)
*B60C 9/22*    (2006.01)

(52) U.S. Cl. .............. 152/517; 152/526; 152/531; 152/533

(58) Field of Classification Search ............. 152/517, 152/526, 531, 533
See application file for complete search history.

(56) References Cited

U.S. PATENT DOCUMENTS

| | | | | |
|---|---|---|---|---|
| 2,958,359 A | * | 11/1960 | Henri et al. | 152/531 |
| 3,386,487 A | * | 6/1968  | Massoubre    | 152/526 |
| 3,983,919 A | * | 10/1976 | Messerly     | 152/517 |
| 4,930,559 A | * | 6/1990  | Takehara et al. | 152/531 |
| 4,934,429 A | * | 6/1990  | Koseki et al. | 152/531 X |
| 5,368,082 A | * | 11/1994 | Oare et al.  | 152/517 |
| 5,746,853 A | * | 5/1998  | Burlacot     | 152/531 |
| 6,668,890 B1 | * | 12/2003 | Kadota      | 152/526 X |
| 2002/0036043 A1 | | 3/2002 | Thielen | |
| 2004/0026000 A1 | | 2/2004 | Shimizu | 152/527 |

FOREIGN PATENT DOCUMENTS

| | | | |
|---|---|---|---|
| EP | 0 938 986 | | 9/1999 |
| EP | 0 955 186 A2 | * | 11/1999 |
| EP | 1 127 714 A | | 8/2001 |
| EP | 1 403 096 A | | 3/2004 |
| FR | 2 121 736 A | | 8/1972 |
| JP | 05238208 A | * | 9/1993 |
| JP | 08216618 A | * | 8/1996 | 152/533 |
| JP | 2000001105 A | * | 1/2000 |
| JP | 2003237315 A | * | 8/2003 |
| WO | WO-02/074560 A1 | * | 9/2002 |
| WO | WO 02/074560 A1 | | 9/2002 |

* cited by examiner

*Primary Examiner*—Adrienne C. Johnstone

(57) ABSTRACT

A pneumatic tire has a tread with shoulders, a belt structure located below the tread, and a carcass with two sidewalls, two inextensible annular beads, and a radial ply structure. The shoulders of the tire have a continuous curving radially outer profile so that the shoulders transition smoothly from the tread profile to the tire sidewalls. The tire has a belt structure formed of an annular layer of parallel cords, the annular layer having a pair of opposing annular edges and a continuous radius curve profile. Located radially inward of the axial edges of the annular layer of the belt structure is an annular reinforcing strip layer. The strip has a width of not greater than 30 mm and extends axially outward of the annular layer edges by a distance of not more than 10 mm.

15 Claims, 1 Drawing Sheet

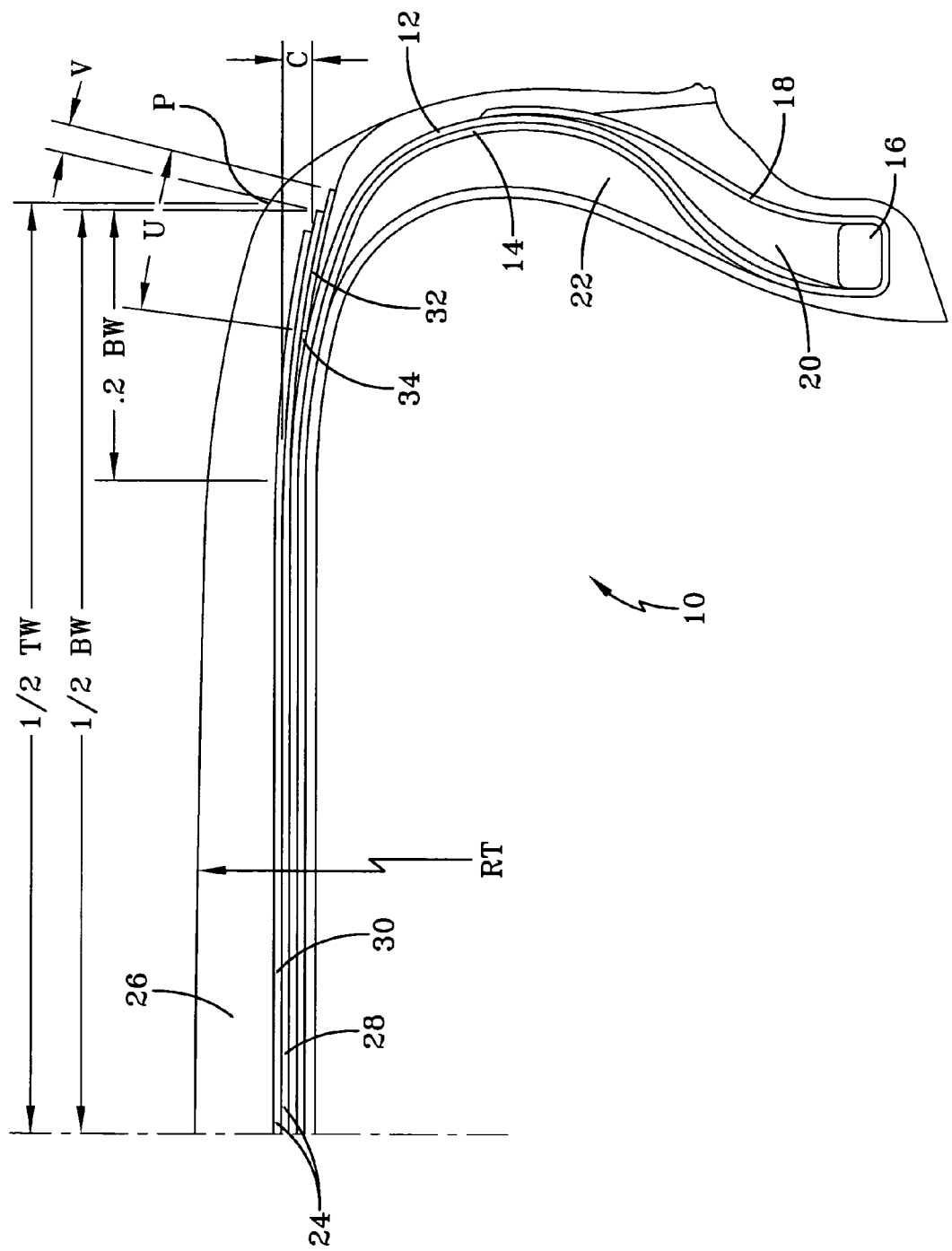

PNEUMATIC TIRE WITH ANNULAR REINFORCING STRIP LAYER

FIELD OF THE INVENTION

The present invention is directed to a pneumatic tire. More specifically, the present invention is directed to a belt structure underlying the tire tread improves the tire's performance characteristics for passenger and light truck tires.

BACKGROUND OF THE INVENTION

Almost all pneumatic tires are given a speed rating based on the maximum speed capability of the tire. The speed rating in conventional use today was developed in response to the need to control the safe performance of tires at standardized speeds. When a vehicle manufacturer specifies tires, the required speed rating for the tire is dictated by the type of vehicle. For a family type sedan car, the speed rating of a tire will likely be lower than the speed rating for a high performance sports car. Current speed ratings begin at 50 km/h, a B speed rating, and go to a Y or ZR speed rating for tires capable of 300 km/h and above. The majority of passenger tires have a speed rating of either SR, 180 km/h, or HR, 210 km/h.

With an ever increasing interest in high performance sports cars, and the desire to drive faster, as permitted on parts of the Autobahn in Germany, the goal is to increase the speed performance of the tire. However, as the tire rotates at a faster speed, the centrifugal force experienced by the tire and the tire components significantly increases. Designing a tire to compensate and withstand these subjected forces can involve modifying many factors, including the belt structure, the mold structure, and even the footprint shape. As the speed rating increases, small but incremental changes can yield significant increases in the tire performance and increase the tire rating.

Another desired change in conventional tires is the need for a tire to be capable of operating when in reduced pressure conditions, i.e. a run-flat tire. The majority of run-flat tires in the market place are self-supporting run-flat tires. Such tires are provided with increased thickness sidewalls that support the tire during reduced pressure conditions. The increased sidewall thickness, achieved by the use of additional rubber layers in the sidewall, can reduce a tires speed rating because of the greater weight and internal heat generated by the tire. Thus, the need to have a run-flat tire also affects the normal operation of the tire by reducing the tire's capability.

SUMMARY OF THE INVENTION

One aspect of the invention is directed to achieving an improved speed performance and improved durability of a tire. Another aspect of the invention is directed to the conflicting goals of a run-flat tire with high speed capability, thus providing persons with high performance vehicles with the desired full inflation performance expected and demanded from their vehicle and with assurance that the tire will continue to perform in atypical reduced pressure situations.

Disclosed is a pneumatic tire having a tread with shoulders, a belt structure located below the tread, and a carcass with two sidewalls, two inextensible annular beads, and a radial ply structure. The shoulders of the tire have a continuous curving radially outer profile so that the shoulders transition smoothly from the tread profile to the tire sidewalls; ideally, the locus of the radii defining the shoulder are located on the inner side of the tire. This is distinct from a shoulder have a square shoulder, where the tread comes to an abrupt end hard edge before transitioning into the upper sidewall of the tire. The inventive tire further has a belt structure formed of an annular layer of parallel cords directly adjacent to the radial ply structure, the annular layer having a pair of opposing annular edges and a continuous radius curve profile. Located radially inward of the axial edges of the annular layer of the belt structure, and directly adjacent alonn the axial edges of the annular layer, is an annular reinforcing strip layer. The strip has a width, defined between terminal ends thereof, of not greater than 30 mm and one terminal end of the strip layer extends axially outward of the annular layer edges by a distance of not more than 10 mm.

In one disclosed aspect of the tire, the annular reinforcing strip layer is comprised of cords, the cord material selected from a group of material consisting of nylon, rayon, polyester, aramid, metal, and glass. The cords are inclined at angles of 0° to 5° relative to a centerline of the tire.

In another aspect of the tire, the belt structure includes an overlay ply. The overlay ply is radially outward of the annular layer of parallel cords and has a width greater than the annular layer of parallel cords. The annular reinforcing strip layer may be formed from the same cords as the overlay ply, or the strip may be formed from different types of cords.

In another aspect of the tire, the annular reinforcing strip layer used in the tire has a width of 20, 10, or 5 mm. The strip extends past the belt edges by a distance of not more than either 10 mm, preferably 6 mm, or 75% of the width of the reinforcing strip layer, whichever is the lesser of the two values.

In another aspect of the present invention, the belt structure of the tire has a belt width of at least 95% of the tread width. At the axially outer ends of the belt structure, the annular layers forming the belt structure have a belt ply drop of not more than 6 mm, and ideally have a belt ply drop of not more than 2 mm.

In another aspect of the present invention, the tire with the annular reinforcing strip layers may be a self-supporting run flat tire. The tire has at least one rubber insert located in the sidewall of the tire, axially inward of the radial ply structure. The rubber insert has a Shore A hardness in the range of 45 to 90 at 100° C.

Definitions

The following definitions are controlling for the disclosed invention.

"Apex" means an elastomeric filler located radially above the bead core and between the plies and the turnup ply.

"Annular" means formed like a ring.

"Aspect ratio" of the tire means the ratio of its section height to its section width multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim. The radially inner beads are associated with holding the tire to the wheel rim.

"Belt structure" means at least one annular layers or plies of parallel cords, woven or unwoven, underlying the tread, unanchored to the bead, and having both cord angles in the range from 17° to 28° with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tire parallel to the Equatorial Plane (EP) and perpendicular to the axial direction.

"Contact Patch" means a section of footprint, in a footprint that is divided into sections by wide void areas, that maintains contact with the ground.

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral" means an axial direction.

"Lateral Edge" means the axially outermost edge of the tread as defined by a plane parallel to the equatorial plane and intersecting the outer ends of the axially outermost traction lugs at the radial height of the inner tread surface.

"Normal Inflation Pressure" means a specific design inflation pressure and load assigned by the appropriate stands organization for the service condition for the tire.

"Outer" means toward the tire's exterior.

"Radial" and "radially" mean directions radially toward or away from the axis of rotation of the tire.

"Shoulder" means the upper portion of sidewall just below the tread edge, effects cornering. Tread shoulder or shoulder rib means that portion of the tread near the shoulder.

"Sidewall" means that portion of a tire between the tread and the bead.

"Tread Pressure" means the distribution of load across the footprint area of tire.

"Tread Width" means the arc length of the tread surface in the axial direction, that is, in a plane parallel to the axis of rotation of the tire.

"Turn-up ply" means an end of a carcass ply that wraps around one bead only.

BRIEF DESCRIPTION OF THE DRAWINGS

The invention will be described by way of example and with reference to the accompanying FIGURE in which is illustrated a cross sectional view of a tire half in accordance with the present invention.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Based on conventional manufacturing sequences, there are two basic parts of pneumatic radial ply tires used on cars and trucks. One part is the carcass, typically assembled on a cylindrical building drum prior to expansion. The carcass includes the reinforcing plies, two inextensible annular beads, sidewalls, the innerliner, and the elastomeric material that holds those components together after the tire is assembled and the carcass is cured. The other part of the tire is the crown, which is assembled separately from the carcass and includes the tread and the underlying belts or breakers, also held together by a matrix of cured rubber. The carcass is joined with the crown before being cured under pressure in a heated press that, as well as curing the rubber, impresses the tread pattern into the radially outermost rubber and also creates any desired sidewall patterns and required indicia on the sidewalls.

In such a generalized or generic tire, the belts or breakers, which are most often made of steel or other essentially inextensible material, are part of the crown assembly and are disposed immediately adjacent to, though radially outward of, the ply layers of the carcass.

Referring now to the FIGURE, there is shown in cross sectional view a segment of a molded self-supporting radial ply tire 10 incorporating an aspect of the present invention. The non-illustrated half of the tire 10 is symmetrical to that illustrated. The carcass has at least one radial ply layer forming the primary reinforcing structure to the tire. In the illustrated tire, the carcass has an outer radial ply layer 12, an inner radial ply layer 14, together comprising a radial ply structure. The end of the inner radial ply layer 14 is wrapped about an inextensible annular bead 16 with the terminal ends of the ply layer being radially inward and axially outward of the belt structure 24. To space the turn-up ply 18 of the inner radial ply layer 14 from the outer radial ply layer 12, an apex 20 may be placed radially outward of the annular bead 16. Radially inward of the ply layers 12, 14, in each sidewall is a sidewall wedge insert 22. The sidewall wedge insert 22 provides the tire with run-flat, self-supporting capabilities. Such items are known in the art and will not be discussed at length herein. Though FIG. 1 shows a self-supporting run-flat tire design, it is also contemplated by the inventors to incorporate the present invention in non self-supporting type tires or other type of run-flat tires. The tire structure would be as discussed above and below, sans the wedge insert 22.

A belt structure 24 and a tread 26 are radially outward of the carcass ply layers 12, 14. The belt structure 24 has at least one radially innermost ply 28 of parallel cords that is directly adjacent to the outermost radial ply layer 12 for the majority of its axial width. Outward of the innermost ply 28 may be at least one more ply 30 of parallel cords, as illustrated. The parallel cords of the adjacent layer 30 are preferably inclined at an equal angle but opposite hand from the inclination of the cords in the innermost ply 28.

In the lateral regions of the radially innermost belt ply 28, the belt ply 28 is distanced from the carcass plies 12, 14 as the carcass ply path follows the outer contour of the run-flat insert 22. In the outer 20% of the belt width BW the belt plies 28, 30 curve radially inward. The belt ply drop C is defined as the drop of the centerline of the belt structure 24 from a point at 20% of the belt width BW to the axially outermost point of the belt center line. The belt ply drop C influences heel and toe wear of a tire. A lower belt ply drop C improves the heel and toe wear of the tread. Preferably, the belt ply drop C is less than 6 mm and more preferably, the belt ply drop C is less than 2 mm.

The belt structure 24 has a width BW of at least 95% of the tread width TW. The tread width TW is measured from the shoulder drop point P along the outer profile of the tire 10. A wider belt structure 24 increases the high speed performance of a tire, but necessitates a way of keeping the belt edges at the desired profile and a minimized belt ply drop C.

The outer surface of the tread 26 is defined by a smoothly continuous profile. The tread 26 is illustrated with no grooves, however, those skilled in the art will appreciate that the tread 26 may be grooved in any number of tread patterns. Whatever groove pattern is selected, the upper surface of the tread 26 will have the disclosed surface profile. In the central region of the tread, the profile defined by a radius of curvature RT which is preferably similar to the belt profile curvature, creating a substantially constant tread thickness. At the tread edges, in the shoulders of the tire, the tread thickness decreases, and the radii defining the tread profile may decrease.

To maintain the spacing between the lateral edges of the belt structure 24 and the carcass plies 12, 14 in the shoulder region of the tire, conventionally, a rubber wedge is inserted into the spacing. In accordance with an aspect of the present invention, to improve the high speed durability of the tire 10, the spacing is partly maintained by an annular reinforcing strip layer 32 located radially inward of the lateral edges of the radially innermost belt layer 28. The reinforcing strip layer 32 has a width U that prevents the belt layers 28, 30 from lifting at the inside edge 34 of the reinforcing strip layer. Preferably, the strip layer 32 has a width U of at least 5 mm and not greater than 30 mm, preferably not more than 20 mm. If the width U of the layer 32 is greater than 30 mm, a bend in the belt structure 24 may be created.

The reinforcing strip layer 32 is formed of at least one ply of parallel reinforcing cords inclined at 0° to 5° relative to the centerline of the tire 10. The cords may be formed of any conventional tire cord materials, such as, but not limited to, nylon, rayon, polyester, aramid, metal, or glass. The cords should be formed as high elongation cords, i.e. having a relative elongation of at least 4% when under a tensile force equal to the breaking load. The reinforcing strip layer 32 may be formed from the same material used as an overlay ply, if an overlay ply is present in the belt structure 24. To obtain the width U of at least 5 mm and not greater than 30 mm, the layer 32 may be formed of adjacent smaller width strips, such as 4 strips of 5 mm wide plies to form a reinforcing strip layer of 20 mm width.

The reinforcing strip layer 32 extends axially outward of the innermost belt ply by a distance V. The strip layer 32 preferably extends outward from the belt structure 24 by no more than 10 mm, preferably not more than 6 mm, regardless of the width U of the strip layer 32. Additionally, the strip layer 32 should extend past the belt structure 24 by a width V of not more than 75% of the strip width U. The amount of the extension width V will be whichever is the lesser value. For example, when the strip layer 32 has a width U of 5 mm, the extension width V should not be greater than 75% or 3.75 mm. When the strip layer 32 has a width of 20 mm, the extension width V is not more than 10 mm, or 50% of the strip layer width U and when the strip layer 32 has a width U of 30 mm, the strip layer 32 has an extension width V of not more than 10 mm, or 33% of the strip layer width V.

By providing the annular reinforcing strip layer 32 under the lateral edge of the innermost belt layer 28, endurance characteristics of the tire 10 are improved.

In testing, three tires A, C, E were constructed in accordance with the present invention and as illustrated in the FIGURE, were compared against control tires, B, D, F. The comparative tires had a similar carcass construction to the same sized inventive tires and had annular reinforcing strip layers over the belt structure in the shoulder region of the tires in the manner noted in the Table. The inventive tires and comparative tires were tested and the results are set forth below.

| Tire size | A<br>225/35ZR19* | B<br>225/35ZR19* | C<br>225/35ZR19* | D<br>225/35ZR19* | E<br>235/40ZR18** | F<br>235/40ZR18** |
|---|---|---|---|---|---|---|
| | | | Reinforcing strip layer | | | |
| Width, mm | 20 | 20 | 15 | 15 | 10 | 10 |
| Location | in shoulder, above belt plies | under innermost belt ply ending | in shoulder, above belt plies | under innermost belt ply ending | In shoulder, above belt plies | under innermost belt ply ending |
| | | | High Speed Performance | | | |
| Max Speed, km/h | 340 | 350 | 340 | 350 | 290 | 300 |
| Time at Max Speed | 35 seconds | 5 minutes | 3 minutes | 4 minutes | 6 minutes | 6 minutes |

*Test Conditions: load: 432 kg; inflation: 2.7 bar; 1.2° camber angle; 8.5" rim
**Test Conditions: load: 431 kg; inflation 3.0 bar; 4° camber angle; 9" rim The speed tests were an incremental step speed test performed in the following manner: 5 minutes at 210 km/h; 30 minutes at 240 km/h; 30 minutes at 270 km/h; 10 minutes at 280 km/h; 10 minutes at 290 km/h. Once the tire had performed at 290 km/h for the ten minutes, the speed was increased by 10 km/h and then by another 10 km/h every ten minutes thereafter until tire failure was achieved.

The test results show that a higher maximum speed and time at maximum speed are achieved when the reinforcing strip layer 32 is radially inward of the belt ply endings as shown in the FIGURE rather than such a layer being located above the belt structure 24. Additionally, the speed increases for increased width of the strip layer 32.

The reason for the increased maximum speed may be as follows. Tire failure is usually caused by two factors: a standing wave generated by the centrifugal force or heat buildup in the tire. If the generation of the standing wave can be pushed to a higher speed and the internal tire temperature controlled, then the tire will perform for a longer time and will be capable of higher speeds. In the inventive tire, mitigation of both factors occurs. The presence of the annular reinforcing strip layer maintains the belt profile in a desired flatter profile, pushing out the standing wave generation. Additionally, by replacing some of the rubber of the typical shoulder wedge under the belt edge, the amount of rubber in the shoulder region is reduced, decreasing the heat buildup.

Due to the presence of the annular reinforcing strip layer 32, the footprint shape factor is also increased. Footprint shape factor (FSF) is the ratio of the footprint length at the center of the tread to the footprint length at the tread edges. To calculate FSF, the maximum axial width W of the footprint is first measured. Then, the distance halfway between the maximum axial width W is defined as the tire's centerplane CP. A distance 40% of the tread width (W) on each side of the centerplane is located and lines parallel to the tire's centerplane are drawn. The length of the parallel lines is calculated, summed, and divided by 2 to arrive at an average shoulder length $L_S$. The footprint length $L_C$ at the centerplane is measured. The footprint shape factor F is the ratio of $L_C/L_S$.

The observed increase in the FSF is believed to be due to an increased restraint of the belt plies 28, 30 at the shoulder edges. While an overlay layer outward of such belt plies 28, 30 acts to restrain radial growth of the belt structure 24 and the belt edges, the annular reinforcing strip layer 32 acts to restrain radial growth of the carcass plies 12, 14 in the shoulder region and to maintain a desired belt edge profile.

What is claimed is:

1. A pneumatic tire comprising a tread with shoulders, a belt structure located below the tread, and a carcass with two sidewalls, two inextensible annular beads, and a radial ply structure, the radial ply structure having terminal ends located axially outward and radially inward of the belt structure, the tire characterized by:
   the shoulders each having a continuous curving radially outer profile;
   the belt structure comprising an annular layer of parallel cords directly adjacent to the radial ply structure, the annular layer having a pair of opposing annular edges and a continuous radius curve profile;
   an annular reinforcing strip layer located radially inward and directly adjacent of each annular layer edge along the edge of each annular layer, each strip layer being comprised of cords inclined at an angle of 0° to 5° relative to a centerline of the tire, each strip layer having a width of not greater than 20 mm as measured between terminal ends of the strip layer, and one terminal end of the strip layer extending axially outward of the belt structure, the amount of axial extension of the strip layer being greater than 0mm and not more than 10 mm.

2. The tire of claim 1 wherein the annular reinforcing strip layer is comprised of cords, the cord material selected from a group of material consisting of nylon, rayon, polyester, aramid, metal, and glass.

3. The tire of claim 1 wherein the belt structure further includes an overlay ply located radially outward of the annular layer of parallel cords, the overlay having a width greater than the annular layer of parallel cords.

4. The tire of claim 3 wherein the annular reinforcing strip layer is formed of the same cords as the overlay ply.

5. The tire of claim 3 wherein the annular reinforcing strip layer is formed of cords dissimilar from the cords of the overlay ply.

6. The tire of claim 1, the tire further comprising runflat rubber inserts in the sidewalls.

7. The tire of claim 1, wherein the annular reinforcing strip layer has a width of 15 mm.

8. The tire of claim 1 wherein the annular reinforcing strip is comprised of cords, the cords having a relative elongation of at least 4% when under a tensile force equal to the cord breaking load.

9. The tire of claim 1 wherein the amount of axial extension of the strip layer is not more than 75% of the width of the strip layer.

10. A pneumatic runflat tire, the tire comprising a tread with shoulders, a belt structure located below the tread, and a carcass with a radial ply structure and terminal ends located axially outward and radially inward of the belt structure, two sidewalls, at least one rubber insert axially inward of the radial ply structure in each sidewall, and two inextensible annular beads, the tire characterized by:
    the shoulders each having a continuous curving radially outer profile;
    the belt structure comprising an annular layer of parallel cords directly adjacent to the radial ply structure, the annular layer having a pair of opposing annular edges and a continuous radius curve profile;
    an annular reinforcing strip layer located radially inward and directly adjacent of each annular layer edge along the edge of each annular layer, each strip being comprised of cords inclined at an angle of 0° to 5° relative to a centerline of a tire, each strip having a width of not greater than 20 mm as measured between terminal ends of the strip layer, and one terminal end of the strip layer extending axially outward of the belt structure, the axial extension of the strip layer being greater than 0 mm and not more than 10 mm.

11. The tire of claim 10 wherein the belt structure further includes an overlay ply located radially outward of the annular layer of parallel cords, the overlay having a width greater than the annular layer of parallel cords.

12. The tire of claim 11 wherein the annular reinforcing strip layer is formed of the same cords as the overlay ply.

13. The tire of claim 10 wherein the annular reinforcing strip layer has a width of 15 mm.

14. The tire of claim 10 wherein the annular reinforcing strip is comprised of cords, the cords having a relative elongation of at least 4% when under a tensile force equal to the cord breaking load.

15. The tire of claim 10 wherein the amount of axial extension of the strip layer is not more than 75% of the width of the strip layer.

* * * * *